United States Patent Office 3,337,314
Patented Aug. 22, 1967

3,337,314
METHOD OF PRODUCING FUEL GAS
Robert W. Belfit, Jr., Midland, Mich., assignor to The Dow Chemical Company, Midland, Mich., a corporation of Delaware
No Drawing. Filed Jan. 21, 1964, Ser. No. 339,095
6 Claims. (Cl. 48—197)

This invention relates to a method of producing fuel gas, and more particularly to a method of producing a safe fuel gas mixture containing methyl acetylene, allene, or mixtures thereof.

Methyl acetylene, allene, and mixtures thereof are well known as fuel gases. They are particularly useful for fuel gases employed in flame cutting operations. Methyl acetylene, allene, and mixtures thereof are, however, explosive when found in concentrations greater than about 80 mole percent.

It is an object of this invention to provide a method of producing a fuel gas containing methyl acetylene, allene, or mixtures thereof which is substantially free of explosion hazard.

It is another object of the present invention to provide a method of producing a fuel gas which may be safely liquefied for storage or transportation.

Other objects and advantages of the present invention will become apparent in the course of the following specification.

Methyl acetylene and allene are produced by a variety of different methods. One such method is the heating of a dihalopropane in the presence of an aqueous solution of an alkali metal hydroxide as exemplified by U.S. Patent 2,755,319.

In accordance with the present invention a "diluent" is added to the process feed stock of a dihalopropane-alkali metal hydroxide process and the product stream is subsequently treated to remove and recover fuel gas containing specified amounts of methyl acetylene, allene, or mixtures thereof, and "diluent."

The term "diluent," in accordance with the present invention, means a mixture containing two essential components. The first component consists of propane, propylene, or mixtures thereof. The second component consists of saturated hydrocarbons containing four carbon atoms, ethylenically unsaturated hydrocarbons containing four carbon hydrocarbons or mixtures thereof. Apropriate four carbon hydrocarbons suitable for use as the second diluent component are: n-butane, isobutane, 1-butene, 2-butene, butadiene, isobutene, and mixtures thereof.

First and second components of diluent, in accordance with the present invention, are present in a mole ratio of from about 0.8 to about 19 moles of first component per mole of second component.

In the process illustrated in U.S. Patent 2,755,319, aqueous sodium hydroxide and 1,2-dichloropropane are preheated and separately fed to a reactor continuously and under sufficient pressure to liquefy them at reaction temperatures. Product gases and reacted liquid are removed from the reactor continuously as reaction proceeds.

In accordance with the present invention, diluent is also fed to the reactor, either as a separate feed stream, or in admixture with one or both of the other feed streams. Diluent is fed to the reactor in amounts based on the primary fuel (methyl acetylene, allene, or mixtures thereof) produced. Ordinarily, diluent is fed in an amount of from about 0.333 to about 1.1 moles per mole of primary fuel (methyl acetylene, allene, or mixtures thereof) produced. Preferably, diluent is fed to the reactor in an amount of from about 0.333 to about 0.667 mole per mole of primary fuel produced.

Product obtained from the reactor, then, will contain primary fuel, diluent, and various undesirable materials such as hydrogen, methane, acetylene, acetone, chloropropenes, unreacted 1,2-dichloropropane, and the like.

Product from the reactor is then subjected to treatment such as stripping and fractional distillation to remove the undesirable materials. Fuel gas compositions obtained thereby contain from about 48 to about 75 and preferably from about 60 to about 75 mole percent of primary fuel (methyl acetylene, allene, or mixtures thereof), from about 11 to about 38 mole percent of propane, propylene, or mixtures thereof, and from about 2 to about 14 mole percent of saturated hydrocarbons containing four carbon atoms, ethylenically unsaturated hydrocarbons containing four carbon atoms, or mixtures thereof.

These fuel gas compositions show excellent characteristics for use in flame cutting operations and may be safely compressed or otherwise liquefied for transportation and storage. Further, the fuel gas compositions obtained in accordance with the present invention show substantially constant primary fuel concentrations in both liquid and gas phases when incrementally withdrawn from liquid storage or transportation means.

One of the many advantages of the present method is that the desired fuel gas composition is obtained without the concentration of methyl acetylene and/or allene ever reaching the level (about 80 mole percent) at which explosion hazard becomes a significant problem.

A better understanding of the present invention may be obtained in light of the following examples which are set forth to illustrate, and are not to be construed to limit, the present invention.

Example 1

In a process producing methyl acetylene and allene in accordance with the method shown in U.S. Patent 2,755,319, diluent, consisting essentially of propylene and isobutene in a mole ratio of about 3.3 to 1, respectively, is introduced to the reaction vessel. Diluent is introduced at a rate corresponding to about 0.5 mole of diluent per mole of methyl acetylene and allene produced. Product gas from the reactor is passed through a stripper to remove low boiling constituents such as hydrogen, methane, ethylene, and the like containing two or less carbon atoms. The gas stream from the stripper contains about 10.5 mole percent propylene, 3.1 mole percent isobutene, 2.7 mole percent allene, 25.1 mole percent methyl acetylene, 5 mole percent 2-chloropropene, 28 mole percent trans-1-chloropropene-1, and 25.6 mole percent 1,2-dichloropropane.

This gas mixture from the stripper is distilled and product containing about 25.4 mole percent propylene, 7.5 mole percent isobutene, 6.4 mole percent allene, and 60.7 mole percent methyl acetylene is recovered as distillate.

Example 2

In substantially the manner set forth in Example 1, diluent consisting essentially of propylene and isobutene in a mole ratio of about 3.3 to 1 is introduced to the reactor at a rate corresponding to about 0.8 mole of diluent per mole of methyl acetylene and allene produced. After stripping and distillation, a distillate product gas containing about 34.3 mole percent propylene, 10.4 mole percent isobutene, 21.3 mole percent allene and 34 mole percent methyl acetylene is recovered.

Example 3

In substantially the manner set forth in Example 1, diluent consisting essentially of propane and n-butane in a mole ratio of about 3.6 to 1 is introduced to the reactor at a rate corresponding to about 0.9 mole of diluent per mole of methyl acetylene and allene produced. After stripping and distillation, a distillate product gas containing about 36.4 mole percent propane, 8.6 mole percent n-butane, 5.2 mole percent allene, and 49.8 mole percent methyl acetylene is recovered.

*Example 4*

In substantially the manner set forth in Example 1, diluent consisting essentially of propane and isobutane in a mole ratio of about 2.9 to 1 is introduced to the reactor at a rate corresponding to about 0.6 mole of diluent per mole of methyl acetylene and allene produced. After stripping and distillation, a distillate product gas containing about 28.2 mole percent propane, 9.4 mole percent isobutane, 24 mole percent allene, and 38.4 mole percent methyl acetylene is recovered.

*Example 5*

In substantially the manner set forth in the foregoing examples, gaseous fuel mixtures are produced in accordance with the present invention when diluent consists essentially of propane, propylene, or mixtures thereof, and n-butane, isobutane, 1-butene, 2-butene, butadiene, isobutene, or mixtures thereof in a mole ratio of from about 0.8 to about 19 to 1, and diluent is introduced to the reactor at a rate corresponding to from about 0.333 to about 1.1 moles of diluent per mole of methyl acetylene and allene produced.

Various modifications may be made in the present invention without departing from the spirit or scope thereof, and it is to be understood that I limit myself only as defined in the appended claims.

I claim:

1. In a method of producing a primary fuel selected from the group consisting of methyl acetylene, allene, and mixtures thereof, which comprises reacting 1,2-dichloropropane with an aqueous alkali metal hydroxide in a reactor, the improvement which comprises providing a diluent having two components, the first component being selected from the group consisting of propane, propylene, and mixtures thereof, the second component consisting of at least one hydrocarbon selected from the group consisting of saturated and ethylenically unsaturated hydrocarbons containing four carbon atoms, said first and second components being present in a mole ratio of from about 0.8 to about 19 moles of said first component per mole of said second component, feeding said diluent to the reactor in an amount of from about 0.333 to about 1.1 moles per mole of primary fuel produced by the reaction, removing product mixed with diluent from the reactor, and distilling the mixture thus obtained, thereby to obtain a composition consisting of from about 48 to about 75 mole percent primary fuel, and from about 52 to about 25 mole percent diluent.

2. In a method of producing a primary fuel selected from the group consisting of methyl acetylene, allene, and mixtures thereof, which comprises reacting 1,2-dichloropropane with an aqueous alkali metal hydroxide in a reactor, the improvement which comprises providing a diluent having two components, the first component being selected from the group consisting of propane, propylene, and mixtures thereof, the second component consisting of at least one hydrocarbon selected from the group consisting of saturated and ethylenically unsaturated hydrocarbons containing four carbon atoms, said first and second components being present in a mole ratio of from about 0.8 to about 19 moles of said first component per mole of said second component, feeding said diluent to the reactor in an amount of from about 0.333 to about 0.667 mole per mole of primary fuel produced by the reaction, removing product mixed with diluent from the reactor, and distilling the mixture thus obtained, thereby to obtain a composition consisting of from about 60 to about 75 mole percent primary fuel, and from about 40 to about 25 mole percent diluent.

3. In a method of producing a primary fuel selected from the group consisting of methyl acetylene, allene, and mixtures thereof, which comprises reacting 1,2-dichloropropane with an aqueous alkali metal hydroxide in a reactor, the improvement which comprises providing a diluent consisting essentially of propylene and isobutene, in a mole ratio of about 3.3 to 1, feeding said diluent to the reactor in an amount of about 0.5 mole per mole of primary fuel produced by the reaction, removing product mixed with diluent from the reactor, and distilling the mixture thus obtained, thereby to obtain a composition consisting of about 67 mole percent primary fuel, and about 33 mole percent diluent.

4. In a method of producing a primary fuel selected from the group consisting of methyl acetylene, allene, and mixtures thereof, which comprises reacting 1,2-dichloropropane with an aqueous alkali metal hydroxide in a reactor, the improvement which comprises providing a diluent consisting essentially of propylene and isobutene in a mole ratio of about 3.3 to 1, feeding said diluent to the reactor in an amount of about 0.8 mole per mole of primary fuel produced by the reaction, removing product mixed with diluent from the reactor, and distilling the mixture thus obtained, thereby to obtain a composition consisting of about 55 mole percent primary fuel, and about 45 mole percent diluent.

5. In a method of producing a primary fuel selected from the group consisting of methyl acetylene, allene, and mixtures thereof, which comprises reacting 1,2-dichloropropane with an aqueous alkali metal hydroxide, the improvement which comprises providing a diluent consisting essentially of propane and n-butane in a mole ratio of about 3.6 to 1, feeding said diluent to the reactor in an amount of about 0.9 mole per mole of primary fuel produced by the reaction, removing product mixed with diluent from the reactor, and distilling the mixture thus obtained, thereby to obtain a composition consisting of about 55 mole percent primary fuel, and about 45 mole percent diluent.

6. In a method of producing a primary fuel selected from the group consisting of methyl acetylene, allene, and mixtures thereof, which comprises reacting 1,2-dichloropropane with an aqueous alkali metal hydroxide, the improvement which comprises providing a diluent consisting essentially of propane and isobutane in a mole ratio of about 2.9 to 1, feeding said diluent to the reactor in an amount of about 0.6 mole per mole of primary fuel produced by the reaction, removing product mixed with diluent from the reactor, and distilling the mixture thus obtained, thereby to obtain a composition consisting of about 62 mole percent primary fuel, and about 38 mole percent diluent.

References Cited

UNITED STATES PATENTS

| | | | |
|---|---|---|---|
| 2,350,984 | 6/1944 | Britton et al. | 260—678 X |
| 3,226,213 | 12/1965 | Nelson et al. | 48—197 |

MORRIS O. WOLK, *Primary Examiner.*

JOSEPH SCOVRONEK, *Examiner.*